US011002172B2

(12) United States Patent
Zenner et al.

(10) Patent No.: US 11,002,172 B2
(45) Date of Patent: May 11, 2021

(54) METHOD AND SYSTEM FOR EXHAUST-GAS HEAT MANAGEMENT

(71) Applicant: Ford Global Technologies, LLC, Dearborn, MI (US)

(72) Inventors: Thomas Zenner, Dueren (DE); Martin Wirth, Remscheid (DE); Lars Kaufmann, Alfter (DE); Mehmet Toeremis, Bergheim-Glessen (DE); Daniel Benjamin Kok, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/013,584

(22) Filed: Jun. 20, 2018

(65) Prior Publication Data
US 2019/0040782 A1     Feb. 7, 2019

(30) Foreign Application Priority Data
Aug. 1, 2017   (DE) .......................... 102017213213.2

(51) Int. Cl.
    *F01N 9/00*    (2006.01)
    *F01N 5/02*    (2006.01)
    (Continued)

(52) U.S. Cl.
    CPC .............. *F01N 9/00* (2013.01); *F01N 3/2006* (2013.01); *F01N 5/02* (2013.01); *F01N 11/002* (2013.01);
    (Continued)

(58) Field of Classification Search
CPC . B01D 53/9495; F01N 11/002; F01N 13/141; F01N 13/16; F01N 2240/10;
(Continued)

(56) References Cited

U.S. PATENT DOCUMENTS 5,477,676 A   12/1995  Benson et al.
6,718,758 B1   4/2004  Suzuki
(Continued)

FOREIGN PATENT DOCUMENTS

CN       104632499 A     5/2015
DE    102011017764 A1   10/2012
(Continued)

*Primary Examiner* — Anthony Ayala Delgado
(74) *Attorney, Agent, or Firm* — David Kelley; McCoy Russell LLP

(57) ABSTRACT

A exhaust-gas heat management system includes a catalytic converter in the exhaust-gas train of an internal-combustion engine, a cover enclosing the catalytic converter, and thereby realizing a cavity for holding a latent-heat storage PCM, at least two fluid connections between the cavity and the collecting vessel, and a pump device for activating and deactivating a PCM circuit between the cavity and the collecting vessel by means of the fluid connections. A method comprises determining an operating state of the internal combustion engine, determining the catalytic converter temperature, determining the PCM temperature, activating the PCM circuit if the PCM temperature is above a phase transition temperature of the PCM, and the internal combustion engine is in a switched-on operating state or the internal combustion engine is in a switched-off operating state and the catalytic converter temperature is below a light-off temperature of the catalytic converter.

20 Claims, 13 Drawing Sheets

(51) Int. Cl.
*F01N 13/16* (2010.01)
*F01N 13/14* (2010.01)
*F01N 3/20* (2006.01)
*F01N 11/00* (2006.01)
*F01P 3/20* (2006.01)
*B01D 53/94* (2006.01)

(52) U.S. Cl.
CPC ........... *F01N 13/141* (2013.01); *F01N 13/16* (2013.01); *F01P 3/20* (2013.01); *B01D 53/9495* (2013.01); *F01N 2240/10* (2013.01); *F01N 2260/08* (2013.01); *F01N 2470/08* (2013.01); *F01N 2560/06* (2013.01); *F01N 2560/14* (2013.01); *F01N 2590/11* (2013.01); *F01N 2900/0414* (2013.01); *F01N 2900/0416* (2013.01); *F01N 2900/08* (2013.01); *F01N 2900/10* (2013.01); *F01N 2900/102* (2013.01); *F01N 2900/104* (2013.01); *F01N 2900/12* (2013.01); *F01N 2900/1602* (2013.01); *F01P 2060/18* (2013.01)

(58) Field of Classification Search
CPC ............. F01N 2260/08; F01N 2470/08; F01N 2560/06; F01N 2560/14; F01N 2590/11; F01N 2900/0414; F01N 2900/0416; F01N 2900/08; F01N 2900/10; F01N 2900/102; F01N 2900/104; F01N 2900/12; F01N 2900/1602; F01N 3/2006; F01N 5/02; F01N 9/00; F01P 2060/18; F01P 3/20
See application file for complete search history.

(56) References Cited

U.S. PATENT DOCUMENTS

| | | | | |
|---|---|---|---|---|
| 2002/0139114 | A1* | 10/2002 | Dickau | F01N 3/2882 60/300 |
| 2004/0101722 | A1* | 5/2004 | Faye | H01M 8/04014 429/440 |
| 2005/0202933 | A1* | 9/2005 | Sorab | F16H 57/0413 477/161 |
| 2010/0146943 | A1* | 6/2010 | Muramatsu | F01N 3/2046 60/286 |
| 2012/0090293 | A1* | 4/2012 | Barrieu | F01K 13/02 60/273 |
| 2012/0152487 | A1* | 6/2012 | Styles | F28D 20/028 165/10 |
| 2013/0199164 | A1* | 8/2013 | Levin | B60H 1/20 60/299 |
| 2013/0199750 | A1* | 8/2013 | Levin | B60H 1/20 165/4 |
| 2013/0199751 | A1* | 8/2013 | Levin | F28D 21/0003 165/10 |
| 2015/0013328 | A1* | 1/2015 | Carstensen | F01K 23/065 60/597 |
| 2015/0089922 | A1* | 4/2015 | Hussain | F01P 3/20 60/273 |
| 2015/0089943 | A1* | 4/2015 | Hussain | F01N 5/02 60/615 |
| 2017/0167803 | A1* | 6/2017 | Fuse | C09K 5/02 |

FOREIGN PATENT DOCUMENTS

| | | |
|---|---|---|
| DE | 102014209275 A1 | 11/2015 |
| DE | 102016112232 A1 | 1/2018 |
| EP | 0596854 A1 | 5/1994 |

* cited by examiner

METHOD AND SYSTEM FOR EXHAUST-GAS HEAT MANAGEMENT

CROSS REFERENCE TO RELATED APPLICATION

This application claims priority to German Patent Application No. 102017213213.2, filed Aug. 1, 2017. The entire contents of the above-referenced application are hereby incorporated by reference for all purposes.

FIELD

The invention relates to a method for controlling an exhaust-gas heat management system, to an exhaust-gas heat management system, to a motor vehicle having such an exhaust-gas heat management system, and to a computer program product.

BACKGROUND AND SUMMARY

Hybrid electric motor vehicles, e.g. so-called plug-in hybrid electric vehicles (PHEV), have a rechargeable battery, and can usually be operated in at least two differing modes.

As long as the charge state of the battery is sufficiently high, the hybrid electric motor vehicle can be operated in a mode that reduces the battery charge state, for example in an exclusively electric driving mode, i.e. using exclusively the electric drive train comprising the battery, electric motor, power electronics, etc., or in an electric driving mode with intermittent hybrid driving mode, wherein, in the hybrid driving mode, both the internal combustion engine and the electric motor drive the vehicle, and the hybrid driving mode is used, for example, as soon as the power demand exceeds the maximum power of the electric motor.

If the charge state of the battery falls below a predefined limit value, the hybrid electric vehicle can be operated in a mode that maintains the battery charge state, for example in that the vehicle is operated alternately, in rapid succession, in an electric driving mode and a hybrid driving mode.

Particularly in the case of operating the hybrid electric vehicle in a mode that reduces the battery charge state with intermittent hybrid driving mode, it is frequently not possible to adhere to exhaust-gas limit values, since the catalytic converter arranged in the exhaust-gas train of the internal combustion engine cools down during the periods with electric driving mode, or a particular temperature is not attained. An excessively low temperature of the catalytic converter results in an insufficient catalytic activity, and consequently in an insufficient rate of catalytic conversion of the pollutants to be treated in the catalytic converter. A sufficient catalytic activity can be assumed only upon attainment of the so-called light-off temperature, i.e. the temperature at which a conversion rate of 50% is attained.

The light-off temperature is usually in a temperature range of from 250° C. to 300° C., as can be seen from FIG. 1. If this temperature is not attained, the catalytic converter activity is very low, and the conversion rate for the air pollutants is low. This results in large quantities of carbon monoxide, nitrogen oxides and hydrocarbons being emitted to the environment.

A further problem is the reduction of the charge state of the battery by use of the stored electrical energy for heating the vehicle, e.g. the vehicle interior, by means of PTC (Positive Temperature Coefficient thermistor) auxiliary heaters or heat pumps during the electric driving mode. The electrical energy drawn from the battery reduces the range of the vehicle in the electric driving mode.

For the purpose of remedying the first-mentioned problem, EP 0 596 854 A1 proposes arranging a latent-heat storage device inside the catalytic converter, or a catalytic converter enclosed by means of a latent-heat storage device, in the manner of a casing. In this case, however, there is the disadvantage that the energy consumption and emission of the latent-heat storage device cannot be controlled by open-loop or closed-loop control, and the thermal energy also cannot be used for heating the vehicle.

Known from U.S. Pat. No. 5,477,676 are an apparatus and a method for exhaust-gas heat management in which heat can be delivered to the catalytic converter or absorbed by the latter, according to the requirement. For this purpose, the apparatus has a variable, controllable insulation, which can be switched on when no exhaust gases are being supplied to the catalytic converter or when the catalytic converter temperature is below an optimum working temperature, and which can be switched off when the catalytic converter temperature rises above an optimum working temperature.

According to U.S. Pat. No. 5,477,676, the catalytic converter is enclosed by a cover. Depending on the requirement, a medium for absorbing and delivering thermal energy (heat storage medium), for example a latent-heat storage medium (PCM, phase change material), can be introduced into the cavity between the catalytic converter and the cover, and collected in a collecting vessel. An open-loop control device may be provided to switch the insulation on or off, e.g. in dependence on temperature. The heat storage medium may additionally be used to transfer heat from the catalytic converter to the vehicle interior.

The object of the present invention is to specify a possibility for improved open-loop and closed-loop control of an exhaust-gas heat management system.

This object is achieved by a method for controlling an exhaust-gas heat management system, having a catalytic converter arranged in the exhaust-gas train of an internal-combustion engine, a cover, enclosing the catalytic converter, for realizing a cavity between the catalytic converter and the cover, a collecting vessel for holding a latent-heat storage medium, referred to in the following as PCM, at least two fluid connections between the cavity and the collecting vessel, and a pump device for activating and deactivating a PCM circuit between the cavity and the collecting vessel by means of the fluid connections.

For example, the pump device may be arranged in the fluid connection. The fluid connections may be realized, or such that they can be realized, as hoses or pipes.

The exhaust-gas heat management system enables the catalytic converter to be temperature-controlled, for example heating of the catalytic converter if its temperature is below the light-off temperature, or cooling of the catalytic converter if its temperature is above a maximum operating temperature. For this purpose, heat is transferred between the catalytic converter and the PCM present in the cavity between the catalytic converter and the cover. Advantageously, the contact surface area between the catalytic converter may be realized so as to be as large as possible, to enable a rapid transfer of heat.

The PCM may have a high thermal capacity, to enable as much thermal energy as possible to be stored, with a low weight. In one example, a phase transition temperature of the PCM, for the transition from a solid to a liquid phase, may be in a temperature range of between 20° C. and 600° C. at atmospheric pressure. This corresponds to the exhaust-gas temperatures that usually prevail in the exhaust-gas train, and thus also to a usual exhaust-gas temperature.

Further, this phase transition temperature may be as low as possible in the said temperature range, for example below the light-off temperature of the catalytic converter. The phase transition temperature may be, for example, 100° C. or lower.

For example, the PCM may be heated to a temperature above the phase transition temperature, or cooled to a temperature below the phase transition temperature, such that a thermal energy corresponding to the enthalpy of fusion or enthalpy of solidification can be stored or delivered. This has the advantage that a large quantity of thermal energy can be stored, despite a comparatively small temperature change.

The upper limit of the temperature range, of 600° C., results from the fact that some vehicles, in particular plug-in hybrid electric vehicles, are equipped with a naturally-aspirated engine as an internal combustion engine, which can be operated in an Atkinson cycle process. For plug-in hybrid electric vehicles, this constitutes an operating method that is particularly sparing of fuel.

Such naturally-aspirated engines operated in an Atkinson cycle process usually have maximum exhaust-gas temperatures of from 500° C. to 600° C. at the catalytic converter input. Accordingly, it is advantageous if the PCM is liquid and chemically stable up to temperatures of 600° C. For thermodynamic reasons, the temperature of the PCM cannot exceed 600° C., since the exhaust-gas temperature likewise can maximally be 600° C. The PCM circuit of the exhaust-gas heat management system therefore does not require a heat sink, with the result that the exhaust-gas heat management system can be constructed easily and inexpensively.

Further, atmospheric pressure may prevail in the PCM circuit. Consequently, no additional safety precautions are necessary in respect of an increased or reduced pressure, which minimizes costs and simplifies servicing and maintenance.

Furthermore, the PCM may have no thermal expansion, or only slight thermal expansion, such that the latter can be disregarded and the method can be simplified as a result.

As an example, a non-toxic, non-corrosive and/or inert medium may be used. Inert means that, during use, the PCM does not undergo any change, or at most undergoes a change that does not impair function.

Also, all component parts of the system that come into contact with the PCM are realized so as to be resistant to possible corrosive attacks of the PCM.

Salts or salt mixtures, for example, may be used as a PCM, e.g. a salt mixture composed of sodium nitrate, potassium nitrate or calcium nitrate. At atmospheric pressure, such a salt mixture may have a melting temperature, as a phase transition temperature, in the range of between 125 and 175° C., e.g. 150° C., and in the liquid state be heated to temperatures of up to 600° C., i.e. the thermal capacity is high, and has a low thermal expansion.

The absorption of thermal energy by the PCM may be effected in that thermal energy from the catalytic converter is transferred to the part of the PCM that is located in the cavity, in contact with the catalytic converter. The transfer of heat can be made more efficient by activating the PCM circuit, since the PCM consequently flows past the catalytic converter.

An additional heat transfer medium, for transferring heat between exhaust gas from the internal combustion engine and the PCM, may optionally be provided for the purpose of heating the PCM.

Further, for the purpose of heating the PCM, an electrical heating element may optionally be provided, for example for inductive heating (inductive heating element) or for resistance heating (resistive heating element). The electrical heating element may be arranged in the PCM collecting vessel, and heat the PCM in the collecting vessel.

For example, the PCM may be heated by means of the electrical heating element, in order to bring the PCM into a liquid state or to keep it in a liquid state. The electrical heating may be effected, for example, if a battery of a vehicle having the exhaust-gas heat management system is charged at a socket outlet, i.e. the electrical energy is supplied from an external source.

The exhaust-gas heat management system may be constructed, or able to be constructed, such that the transfer of heat between the catalytic converter and the pump device is maximized, to enable the PCM present in the pump device to melt if the temperature of the PCM is below the phase transition temperature. The PCM circuit can thereby be activated rapidly.

The exhaust-gas heat management system may be constructed, or able to be constructed, such that the fluid connections between the cavity and the collecting vessel are realized so as to be as short as possible, in order that the PCM in the fluid connections can be melted as rapidly as possible in the case of cold conditions, e.g. if the temperature of the PCM is below the phase transition temperature. The PCM circuit can thereby be activated rapidly.

The fluid connections may be realized, or able to be realized, so as to be thermally conductive, such that the PCM in the fluid connections can be melted as rapidly as possible in the case of cold conditions, e.g. if the temperature of the PCM is below the phase transition temperature. The PCM circuit can thereby be activated rapidly.

The catalytic converter may be thermally insulated, or able to be thermally insulated, with respect to the exhaust-gas train upstream and downstream from the catalytic converter, such that thermal energy losses can be minimized if the internal combustion engine is in a switched-off operating state.

The collecting vessel may be thermally insulated, or able to be thermally insulated, in order to keep thermal energy losses of the PCM in the collecting vessel as low as possible. For example, the PCM in the collecting vessel may be kept in a liquid state for as long a time span as possible, e.g. for a period of several days.

Optionally, heat exchangers, i.e. devices for transferring heat, may be arranged, or able to be arranged, in the collecting vessel. It is thereby made possible to transfer heat from the PCM to another medium, e.g. to an engine coolant, engine oil or air for ventilating the vehicle interior, or another liquid or gaseous medium. Thermal energy can thereby be given off in the event of excessive heating of the PCM. For example, thermal energy originally contained in the exhaust gas can be used for heating the internal combustion engine or the air to be supplied to the vehicle interior.

According to the invention, the method has the features to be explained in greater detail in the following, which may be effected in the sequence of explanation, but also in a different sequence, according to requirement.

According to the invention, the following quantities are determined: the operating state of the internal combustion engine, i.e. whether the latter is switched on or switched off, the catalytic converter temperature and the PCM temperature, e.g. the PCM temperature in the pump device or, alternatively, in the collecting vessel. Determination of temperature in the pump device has the advantage that switching-on of the pump can be avoided while the PCM is in the solid phase.

The PCM circuit is activated or deactivated in dependence on these quantities. Activating in this case includes maintaining the activated state, provided that the conditions relevant for activation, as explained in the following, are fulfilled. Deactivating in this case includes maintaining the deactivated state, provided that the conditions relevant for deactivation, as explained in the following, are fulfilled.

The PCM circuit is activated, for example, in that the pump device is switched on if the PCM temperature is above a phase transition temperature of the PCM, i.e., for example, a salt suitable as a PCM is in a liquid state, and in addition the internal combustion engine is in a switched-on operating state (first activation alternative), or the internal combustion engine is in a switched-off operating state and the catalytic converter temperature is below a light-off temperature of the catalytic converter (second activation alternative).

The PCM circuit is deactivated if the internal combustion engine is in a switched-off operating state and the catalytic converter temperature is above a light-off temperature of the catalytic converter (first deactivation alternative), or the PCM temperature is below a phase transition temperature of the PCM, i.e., for example, a salt suitable as a PCM is in a solid state (second deactivation alternative).

This control strategy for the pump device, and thus for the PCM circuit, is based on the following considerations. During electric drive mode, there is no need to activate the pump device, and thus the PCM circuit, as long as the catalytic converter temperature is above the light-off temperature of the catalytic converter. If, on the other hand, the catalytic converter temperature falls to a temperature below the light-off temperature, the PCM circuit is activated to enable thermal energy stored in the PCM to be transferred to the catalytic converter, and thus to raise its temperature again, or to maintain its temperature, or at least to achieve a slower cooling. Optionally, this activating according to the second activation alternative may be effected only if switching-on of the internal combustion engine is to be anticipated, as described below.

If the internal combustion engine is in a switched-on state, the PCM can absorb thermal energy and store it for the next use. Excessive heating of the catalytic converter can thereby be avoided.

If the PCM is below a phase transition temperature, e.g. a phase transition temperature from the liquid to the solid state, no advantages ensue from activating the PCM circuit, since the PCM cannot be pumped in the solid state. This is irrespective of the operating state of the internal combustion engine. In this case, the PCM can be heated, by conduction of heat from the catalytic converter, to a temperature above the phase transition temperature. The thermal conduction may be assisted in that the fluid connections are made, or able to be made, of a material of high thermal conductivity, e.g. metal.

According to various embodiments, it may be provided that the method furthermore comprises defining a limit temperature for the PCM. The PCM circuit is then activated only if the PCM temperature is below the limit temperature. An ideal storage temperature, for example, may be defined as a limit temperature. If this temperature is attained or exceeded, the PCM circuit may be deactivated in order to save energy, since, after the ideal storage temperature has been attained, scarcely any more thermal energy can be absorbed by the PCM. A maximum catalytic converter temperature may be considered to be an ideal storage temperature, i.e. a maximum operating temperature of the catalytic converter at which there is no damage to the catalytic converter caused by temperature.

Optionally, a safety buffer may be provided, i.e. a temperature buffer that follows the maximum operating temperature of the catalytic converter, in the direction of lower temperatures. For example, the limit temperature may thus be defined between 20 K and 80 K lower, e.g. 50 K lower, than a maximum operating temperature of the catalytic converter.

According to further embodiment variants, it may be provided that, in the case of a catalytic converter being in the switched-off operating state, according to the second activation alternative, the PCM circuit is activated only if a change in the operating state of the internal combustion engine, to a switched-on operating state, is to be anticipated.

It is thereby possible to avoid pointlessly activating the PCM circuit and, for example, heating the catalytic converter, if this is not necessary, because the internal combustion engine will not be in a switched-on operating state within a foreseeable period of time.

The anticipation of a change in the operating state may be defined on the basis of various criteria, and determined by means of various method steps.

According to various embodiment variants, the method may therefore comprise determining a power demand and determining an electrical power capacity. A change in the operating state of the internal combustion engine, to a switched-on operating state, is to be anticipated if the power demand exceeds the electrical power capacity.

The power demand may exceed the electrical power capacity, for example, if the charge state of the battery is too low, i.e. there is no more electrical power available, or if there is an unusually high power demand that cannot be covered by the capacity available, e.g. to enable an ascending route to be completed.

According to various embodiment variants, the method may furthermore comprise defining a time span $\Delta t$. A change in the operating state of the internal combustion engine, to a switched-on operating state, is then to be anticipated if the power demand exceeds the electrical power capacity within the time span $\Delta t$. The time span $\Delta t$ may be specified and defined, for example, as a constant.

Alternatively, the time span $\Delta t$ may be defined as a variable in dependence on various influencing factors such as, for example, catalytic converter temperature, ambient temperature, PCM temperature, speed of the vehicle and the associated convection cooling of the catalytic converter, etc.

According to further embodiment variants, the time span $\Delta t$ may be defined in accordance with the light-off time span of the catalytic converter, i.e. the time span that is required to attain the light-off temperature. The light-off time span in this case may be dependent on current conditions such as, for example, the catalytic converter temperature, the ambient temperature, the PCM temperature, the rate of transfer of heat between the catalytic converter and the PCM, which many be influenced by settings of the pump devices such as, for example, the flow rate, etc. The time span $\Delta t$ may be obtained, for example, by means of computer-assisted development (CAE models), which can enable the light-off time span to be derived as a function of the said influencing factors.

According to further embodiment variants, the power demand may be determined from a pedal position of the accelerator pedal. In other words, the power demand may be deduced from the position of the accelerator pedal. The power demand increases as the pressure on the accelerator pedal increases. For example, the power demand may be linearly dependent on the pedal position.

According to further embodiment variants, the power demand may be determined on the basis of route conditions of a route to be completed. For example, the height profile of a route to be completed may be taken into account. The power demand increases in the case of an ascending route (height increase), but decreases in the case of a descending route (height decrease). The height profile may be obtained, for example, by inputting the destination into a navigation system, e.g. a global satellite navigation system such as NAVSTAR GPS, GLONASS, Galileo or Beidou, in that the navigation system calculates the route and outputs the associated height profile for the purpose of determining the power demand. Further route conditions on the basis of which the power demand may be determined are, for example, the condition of the route surface, the volume of traffic, bends, speed restrictions, weather conditions such as wind, precipitation, etc.

According to further embodiment variants, the method may comprise the projection of the electrical power capacity and the power demand at the instant $t_e$, which is defined as a current instant $t_a$ plus a time span $\Delta t$, i.e. $t_e = t_a + \Delta t$. Should—according to the projected values—the power demand exceed the electrical power capacity at the instant $t_e$, according to the method a change in the operating state of the internal combustion engine to a switched-on operating state is anticipated at the instant $t_e$, and therefore the PCM circuit is to be actuated immediately—i.e. in the current instant $t_a$—in that the pump device is switched on. With regard to the definition and meaning of the time span $\Delta t$ and the defining of the time span $\Delta t$ in accordance with a light-off time span of the catalytic converter, reference is made to the statements above.

By means of the method according to the invention, the absorption and delivery of thermal energy by the PCM, i.e. the transfer of heat between the catalytic converter and the PCM, can be controlled in an effective manner. The emission of air pollutants can thereby be reduced, in that the catalytic converter temperature can be held in an optimal range for a longer period of time. For example, time spans in which the internal combustion engine of a plug-in hybrid electric vehicle is in a switched-off operating state, e.g. during an electric driving mode, and which are associated with an unwanted cooling of the catalytic converter, may be bridged, in that the catalytic converter temperature is influenced by means of the PCM.

In addition, the thermal energy stored in the PCM may be used for heating the vehicle interior, such that it is possible to avoid reducing the charge state of the battery, which would otherwise be used to heat the vehicle interior. The range of the vehicle in an electric driving mode can thereby be increased.

Furthermore, the thermal energy stored in the PCM may be used for heating the engine oil. This can reduce the friction inside the internal combustion engine and be instrumental in the internal combustion engine having a longer service life.

Furthermore, the thermal energy stored in the PCM may be used for heating the battery. This can increase the battery power that is available when external temperatures are low.

An exhaust-gas heat management system according to the invention comprises: a catalytic converter arranged in the exhaust-gas train of an internal-combustion engine, a cover, enclosing the catalytic converter, for realizing a cavity between the catalytic converter and the cover, a collecting vessel for holding a latent-heat storage medium, referred to in the following as PCM, at least two fluid connections between the cavity and the collecting vessel, and a pump device for activating and deactivating a PCM circuit between the cavity and the collecting vessel by means of the fluid connections, a sensor for determining an operating state of the internal combustion engine, a temperature sensor for determining the catalytic converter temperature, a temperature sensor for determining the PCM temperature, and a control unit designed to control the pump device in dependence on the operating state of the internal combustion engine, the catalytic converter temperature and the PCM temperature.

The exhaust-gas heat management system according to the invention is suitable, for example, for executing the method according to the invention explained above. The above statements explaining the method according to the invention therefore also apply to the description of the exhaust-gas heat management system according to the invention. The advantages of the exhaust-gas heat management system according to the invention correspond to those of the method according to the invention and its corresponding embodiment variants.

According to various embodiment variants, the exhaust-gas heat management system may furthermore have means that have the effect that, in the case of a catalytic converter being in the switched-off operating state, the PCM circuit is activated only if a change in the operating state of the internal combustion engine, to a switched-on operating state, is to be anticipated.

A motor vehicle according to the invention has an exhaust-gas heat management system according to the preceding description.

According to various embodiments, the motor vehicle may be realized as a plug-in hybrid electric vehicle (PHEV). Since PHEVs, besides having an electric drive, also have an internal combustion engine for driving the vehicle, at least for short periods, in particular travel situations that have a high power demand, but with the light-off temperature of the catalytic converter according to the prior art frequently not being achieved in this case, an exhaust-gas heat management system according to the invention is particularly well suited for reducing unwanted emissions.

A computer program product according to the invention comprises commands that cause an exhaust-gas heat management system according to the invention to execute a method according to the invention. A computer program product in this case is to be understood to mean a program code that is stored on a suitable medium and/or that can be initiated via a suitable medium. Any medium that is suitable for storing software, for example a DVD, a USB stick, a flashcard or the like, may be used to store the program code. The initiating of the program code may be effected, for example, via the Internet or an intranet, or via another suitable wireless or wired network.

BRIEF DESCRIPTION OF THE FIGURES

Further advantages of the present invention are evident from the detailed description and the illustrations. The invention is explained in greater detail on the basis of the illustration and the following description. There are shown.

In the examples explained in the following, reference is made to the appended drawings, which constitute a part of the examples and in which there are shown, for illustration, specific embodiments in which the invention may be implemented. It is understood that other embodiments may be used, and structural or logical changes may be made, without departure from the protective scope of the present invention. It is understood that the features of the various exemplary embodiments described herein may be combined with each other, unless specifically stated otherwise. The following detailed description is therefore not to be interpreted in a limiting sense, and the protective scope of the present invention is defined by the appended claims. In the figures, elements that are identical or similar are denoted by identical references, insofar as is expedient.

DETAILED DESCRIPTION

Figure 1:
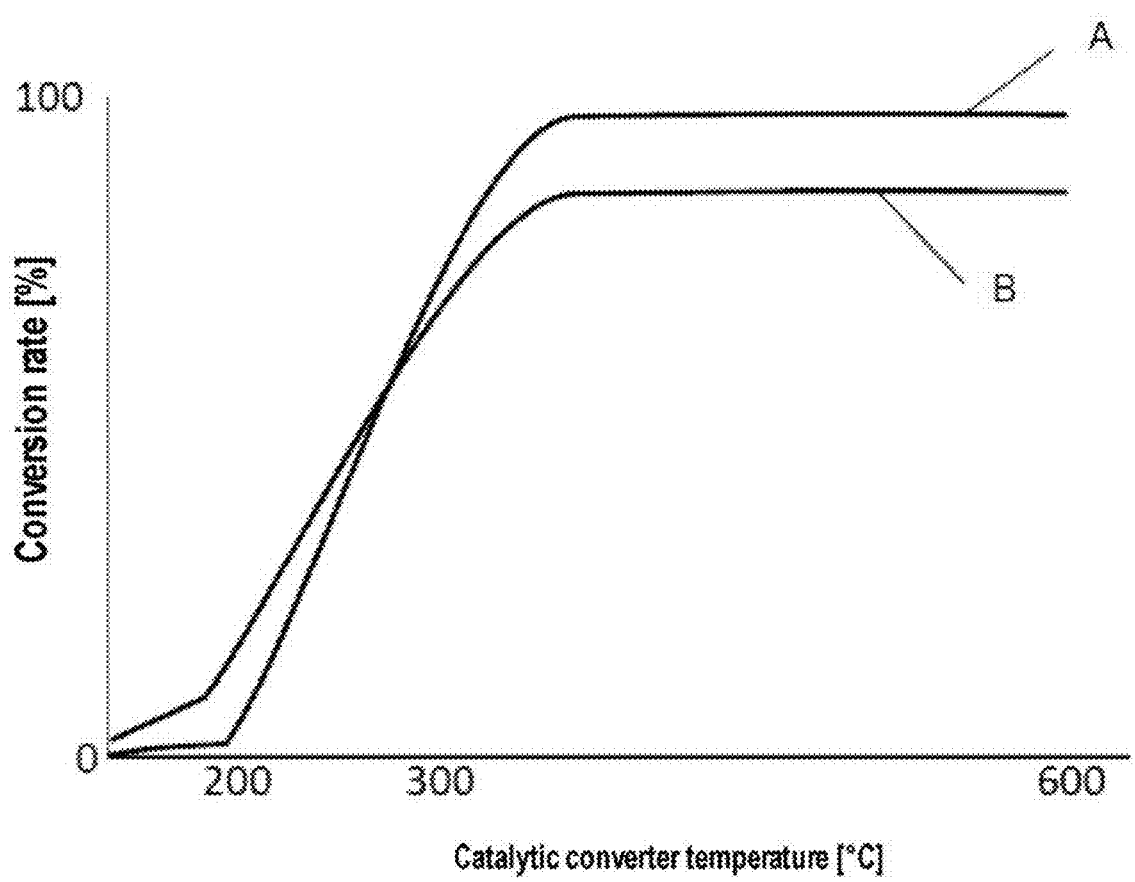
FIG. 1 shows a diagram illustrating the dependence of the conversion rate on the catalytic converter temperature, for various air pollutants.

FIG. 1 shows the dependence of the conversion rate for nitrogen oxides and hydrocarbons (curve A) and carbon monoxide (curve B) on the catalytic converter temperature. It is only at a temperature of approximately 250° C. to 300° C. that the light-off temperature is attained, i.e. the conversion rate is 50%. For an effective catalytic treatment of exhaust gas, the catalytic converter temperature should therefore be above this light-off temperature. The method according to the invention and the exhaust-gas heat management system according to the invention enable this to be achieved for as a long a time period as possible, and thus to reduce the emission of air pollutants.

Figure 2:
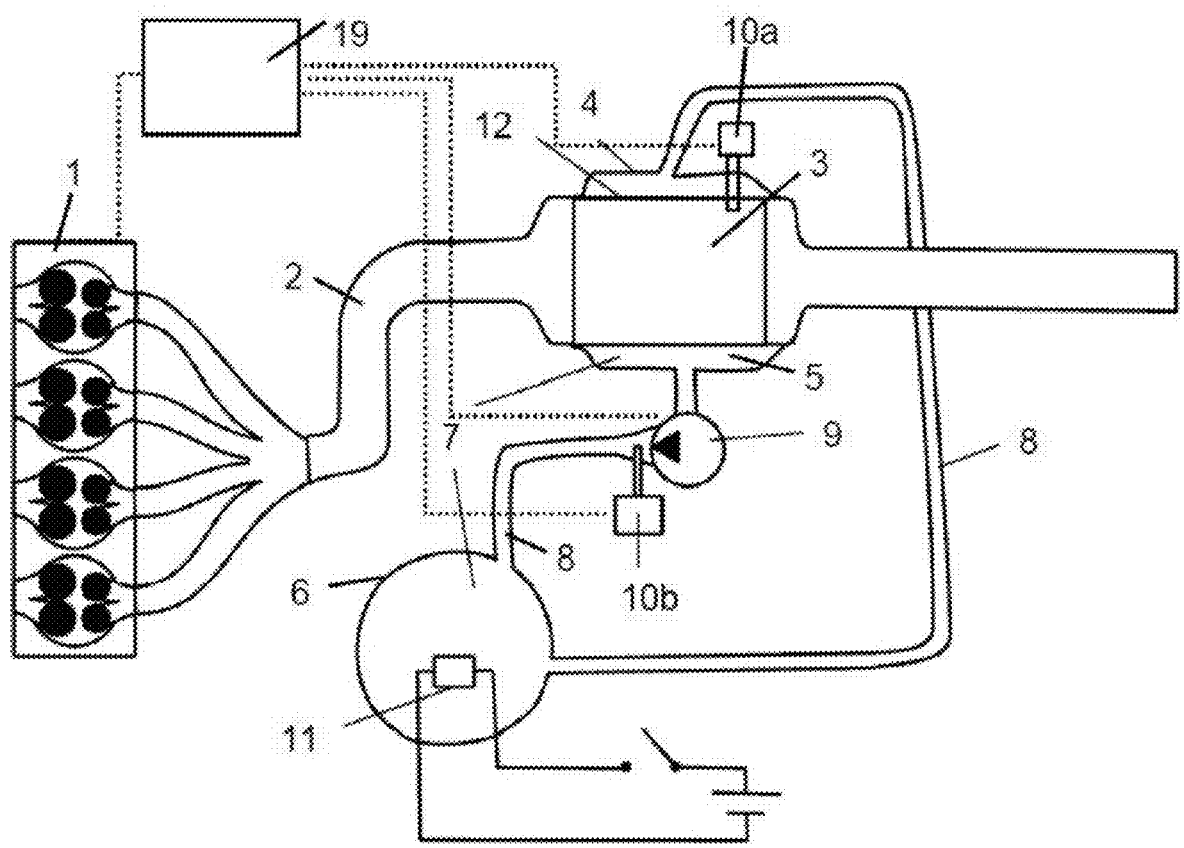
FIG. 2 is a schematic representation of an exhaust-gas heat management system having an optional electrical heating element for heating the PCM in the collecting vessel.

Shown schematically in FIG. 2 is an exhaust-gas heat management system that may be used, for example, for executing the method according to the invention. The internal combustion engine has an internal combustion engine 1, having an exhaust-gas train 2 adjoining the latter. In the exemplary embodiment, the internal combustion engine 1 has four cylinders. However, the invention is not limited to a particular number of cylinders. The internal combustion engine 1 may therefore also have two, three, six, eight or any other number of cylinders. The internal combustion engine 1 may be realized, for example, as a petrol or diesel engine, having spark ignition or self-ignition. The internal combustion engine has a sensor for determining an operating state (not represented).

Arranged in the exhaust-gas train 2 is a catalytic converter 3. The latter serves to treat air pollutants in the exhaust gas of the internal combustion engine 1, e.g. to treat nitrogen oxides, carbon monoxide or hydrocarbons. The catalytic converter 3 comprises a cover 4, such that a cavity 5 is realized between the catalytic converter 3 and the cover 4.

The exhaust-gas heat management system additionally has a collecting vessel 6 for holding a PCM 7. In the exemplary embodiment, a mixture of sodium nitrate, potassium nitrate or calcium nitrate is used as the PCM 7. However, the invention is not limited to a particular PCM 7.

Provided between the collecting vessel 6 and the cavity 5 are two fluid connections 8, which may be realized as hose or pipe connections, such that a circuit for the PCM 7 can be realized between the cavity 5 and the collecting vessel 6 by means of the fluid connections 8.

A pump device 9 is provided to enable the PCM circuit to be activated and deactivated. The pump device 9 is arranged in one of the two fluid connections 8.

In addition, two temperature sensors 10a and 10b are provided. The temperature sensor 10a serves to determine the catalytic converter temperature, while the temperature sensor 10b is designed to determine the PCM temperature. The temperature sensor 10b for determining the PCM temperature is arranged in the fluid connection 8, close to the pump device 9.

Furthermore, the exhaust-gas heat management system has a control unit 19, which is designed to control the pump device 9, i.e., for example, to switch the pump device 9 on and off in dependence on the operating state of the internal combustion engine 1, the catalytic converter temperature and the PCM temperature. Accordingly, operative signaling connections are realized between the control unit 19, the internal combustion engine 1, the temperature sensors 10a and 10b and the pump device. In other words, the PCM circuit can be controlled, i.e. activated or deactivated, by means of the control device 19.

An electrical heating element 11, e.g. an inductive heating element or a resistance heating element, may optionally be arranged in the collecting vessel 6 to enable the PCM 7 in the collecting vessel 6 to be heated.

Also optionally, the exhaust-gas heat management system may have means that have the effect that, in the case of a catalytic converter 3 being in a switched-off operating state, the PCM circuit is activated only if a change in the operating state of the internal combustion engine 1, to a switched-on operating state, is to be anticipated (not represented). Such means may be realized, for example, as a processing unit. For example, in this case the control unit may be realized as a combined control and processing unit.

The exhaust-gas heat management system of the exemplary embodiment may be arranged in a motor vehicle, e.g. a plug-in hybrid electric vehicle.

When the internal combustion engine 1 is in a switched-on operating state, the exhaust-gas heat management system can transfer thermal energy from the exhaust gases in the exhaust-gas train 2, via the catalytic converter 3 and the heat exchange surface 12, to the PCM 7. If the internal combustion engine 1 is in a switched-off operating state, i.e. if cooling of the catalytic converter 3 is imminent, warm PCM 7 can be routed into the cavity 5 and routed past the heat exchange surface 12 by activation of the PCM circuit by means of the pump device 9, such that thermal energy can be transferred from the PCM 7 to the catalytic converter 3.

Figure 3:
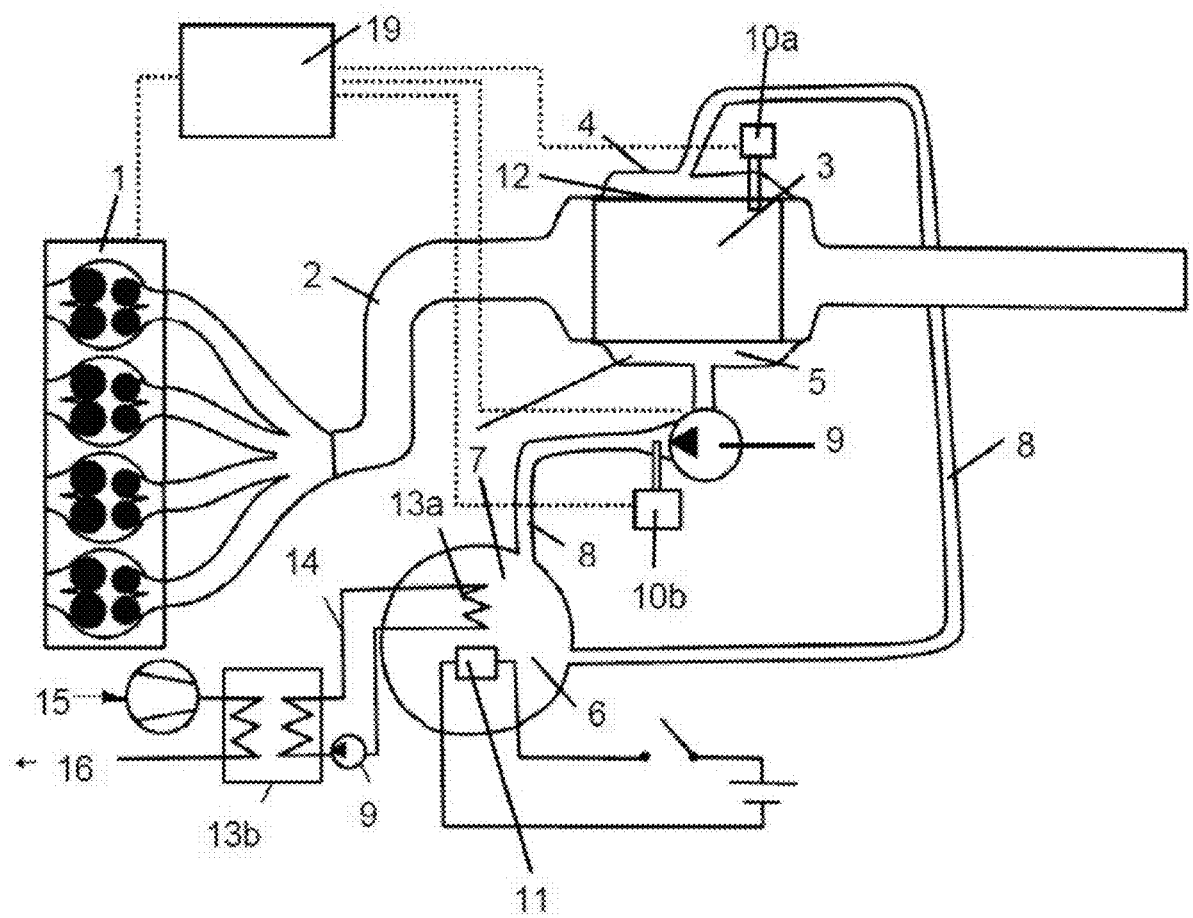
FIG. 3 is a schematic representation of an exhaust-gas heat management system having heat exchangers for transferring heat between the PCM in the collecting vessel and an air flow to be supplied to the vehicle interior.

FIG. 3 shows a further embodiment variant of an exhaust-gas heat management system. This variant differs from the embodiment variant according to FIG. 2 in that provided in the collecting vessel 6 there is a heat exchanger 13a, which serves to transfer heat between the PCM 7 in the collecting vessel 6 and a temperature-control circuit 14 that is activated by means of a further pump device 9. This temperature-control circuit 14 is thermally coupled to a further heat exchanger 13b, which serves to transfer heat between the water of the temperature-control circuit 14 and an air flow for ventilating the vehicle interior. For this purpose, the heat exchanger 13b is supplied with intake air 15 from the environment, which, after having passed the heat exchanger 13b, is supplied, as vehicle interior air 16, to the vehicle interior. Water, for example, may be used as a temperature control medium.

Thermal energy contained in the PCM 7 can thus be used to heat the vehicle interior air 16, such that the proportion of electrical heating of the vehicle interior air 16 can be reduced, and the range of the vehicle in electric driving mode can be increased.

Figure 4:
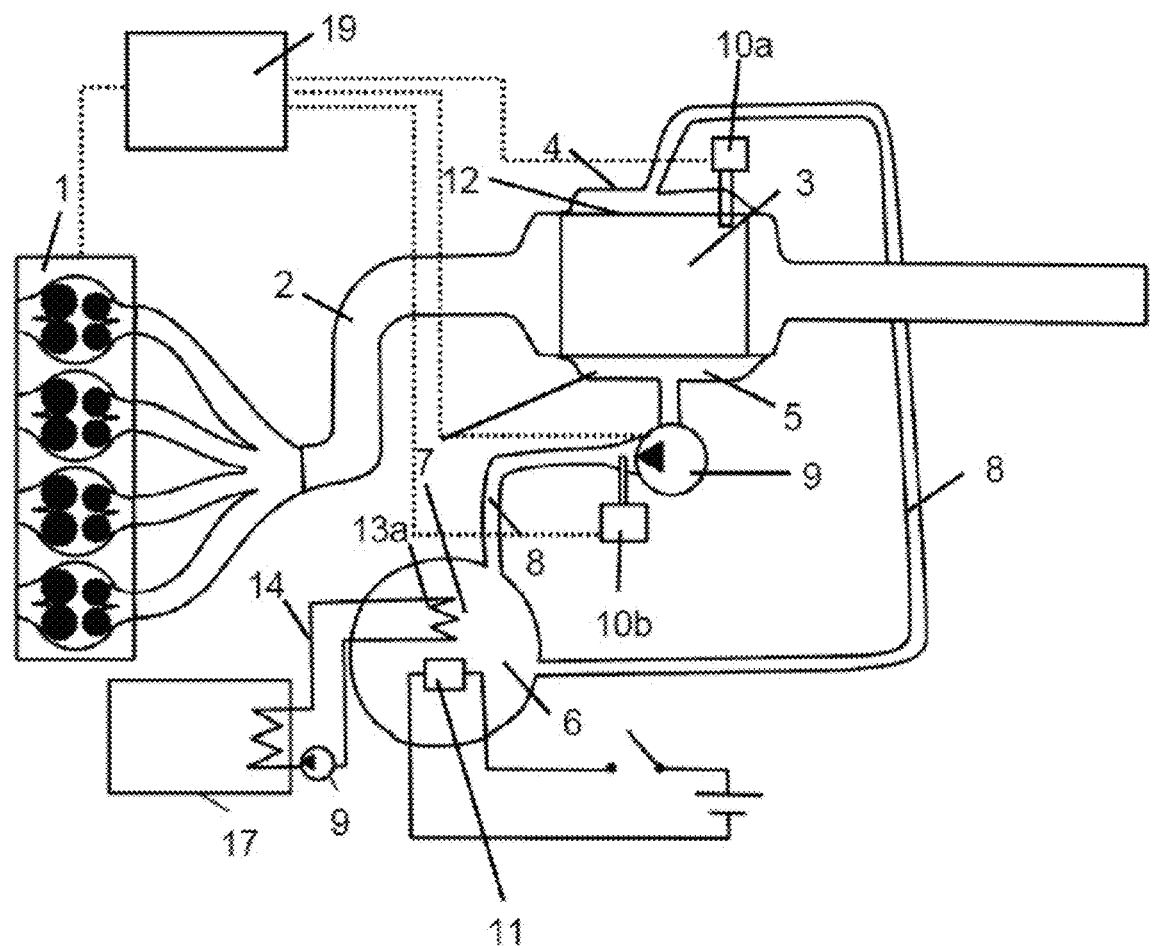
FIG. 4 is a schematic representation of an exhaust-gas heat management system having heat exchangers for transferring heat between the PCM in the collecting vessel and temperature-control circuit for controlling the temperature of the battery.

FIG. 4 shows a further embodiment variant of an exhaust-gas heat management system. This variant differs from the embodiment according to FIG. 2 in that provided in the collecting vessel 6 there is a heat exchanger 13a, which serves to transfer heat between the PCM 7 in the collecting vessel 6 and a temperature-control circuit 14 that is activated by means of a further pump device 9. By means of the temperature control circuit 14, the battery 17 can be temperature-controlled, e.g. heated, which may be necessary, in particular, in the case of very cold external temperatures. The battery may be a battery for storing electrical energy, which can be used for driving a motor vehicle. Water, for example, may be used as a temperature-control medium.

Thermal energy contained in the PCM 7 can thus be used to heat the battery 17, such that lowering of the temperature of the battery 17 can be slowed down or prevented, and damage to the battery 17, or a reduction in the capacity of the battery 17 due to an excessively low temperature, can be avoided.

Figure 5:
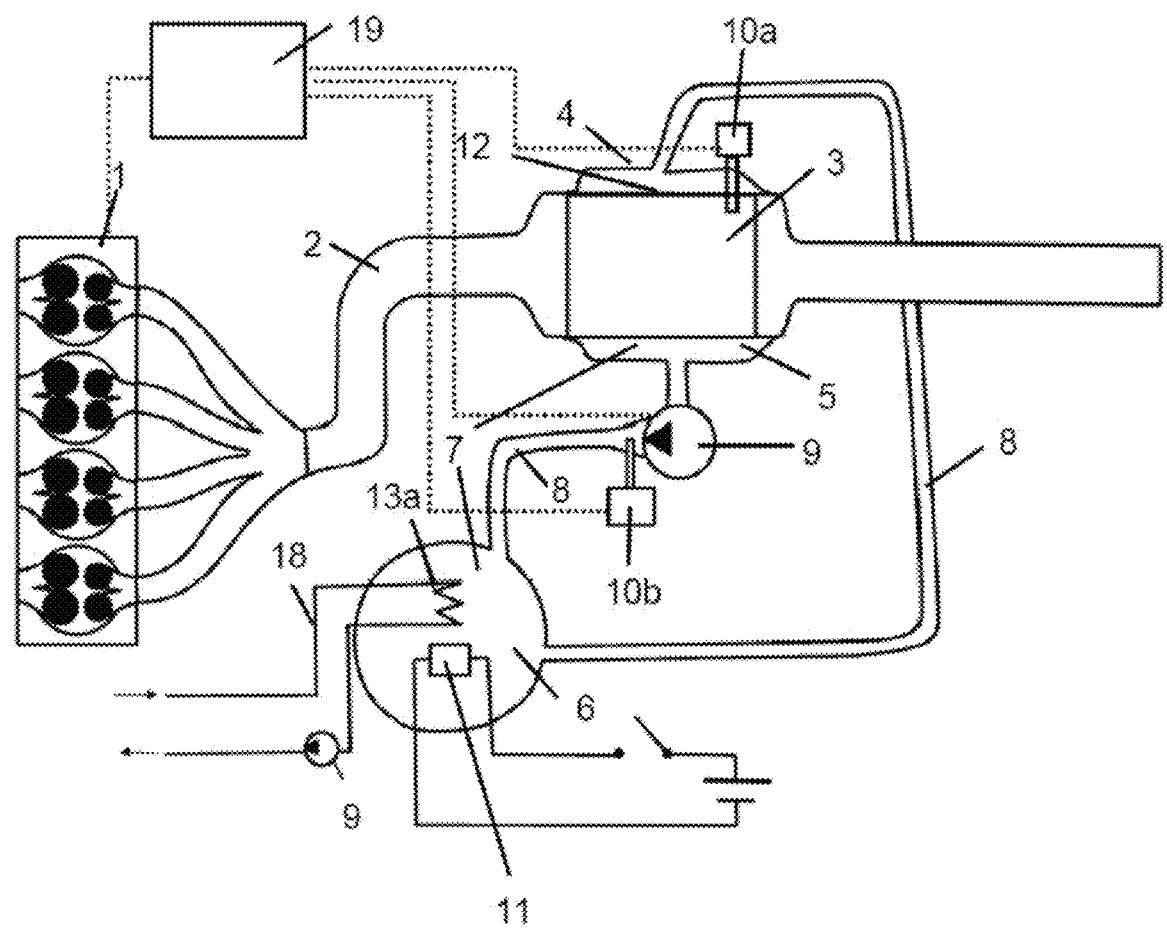
FIG. 5 is a schematic representation of an exhaust-gas heat management system having heat exchangers for transferring heat between the PCM in the collecting vessel and an engine cooling circuit.

FIG. 5 shows a further embodiment variant of an exhaust-gas heat management system. This variant differs from the embodiment according to FIG. 2 in that provided in the collecting vessel 6 there is a heat exchanger 13a, which serves to transfer heat between the PCM 7 in the collecting vessel 6 and an engine cooling circuit 18 that is activated by means of a further pump device 9 in the engine cooling circuit 18. Water, for example, may be used as a coolant in the engine cooling circuit 18. The engine cooling circuit 18 serves to control the temperature of an engine, in particular an internal combustion engine, of a vehicle, for example to control the temperature of the internal combustion engine 1 of the exhaust-gas heat management system. Temperature control in this case includes heating and cooling.

The motor cooling circuit 18 enables heat to be transferred between the PCM 7 in the collecting vessel 6 and the engine temperature-controlled by means of the engine cooling circuit 18. For example, thermal energy from the PCM 7 may be used to heat the engine, enabling the optimal operating temperature of the latter to be attained more rapidly, and emissions of pollutants to be reduced. Moreover, the PCM 7 in the collecting vessel 6 may also be heated by means of the engine cooling circuit 18, in that heat is transferred from the engine to the PCM 7. This might also make it possible to dispense with electrical heating by means of the electrical heating element 11. The heated PCM 7, for its part, may then be used to heat the catalytic converter 3.

Figure 6:
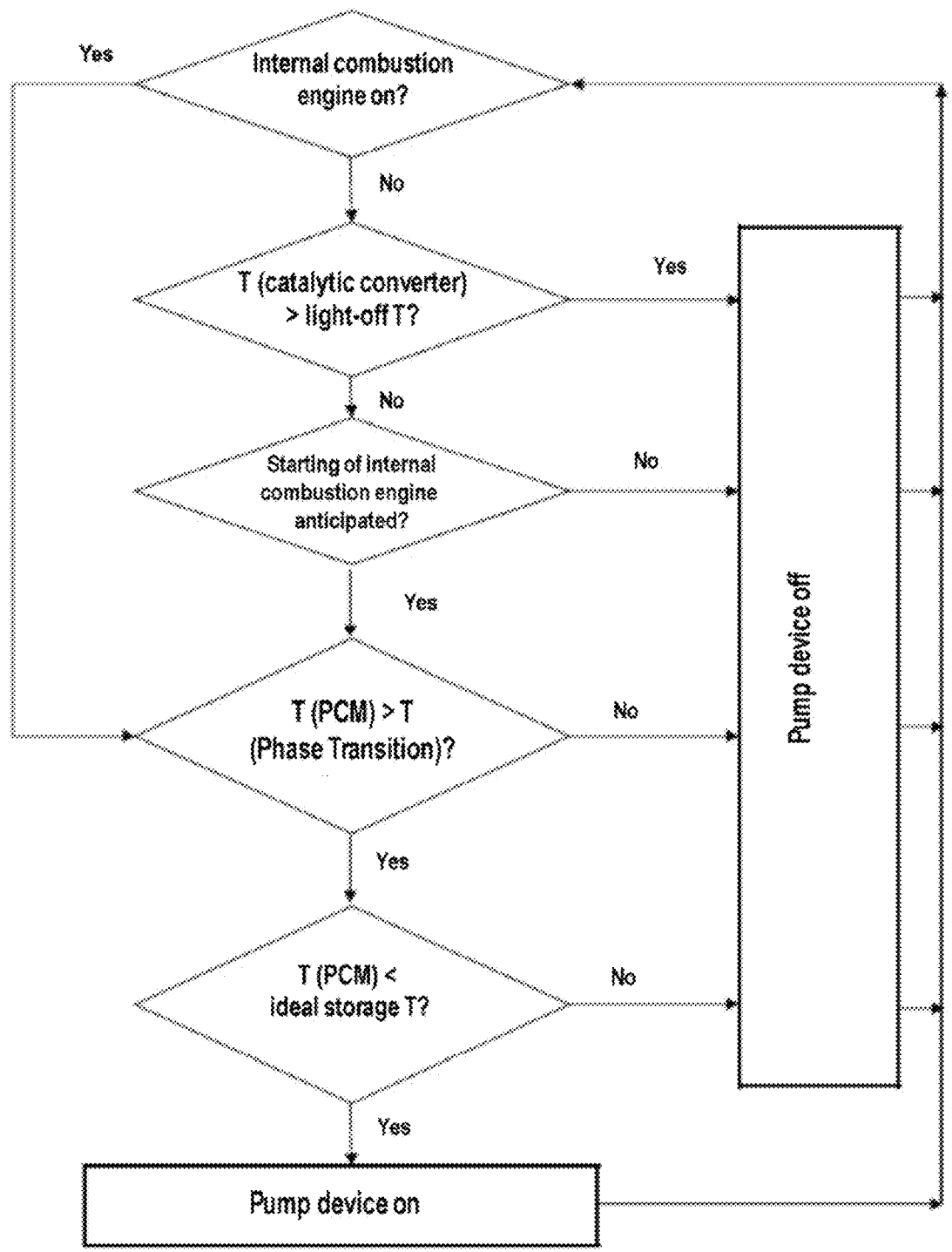
FIG. 6 shows a flow diagram of a method for controlling an exhaust-gas heat management system.

FIG. 6 shows a flow diagram of a method for controlling an exhaust-gas heat management system, for example an exhaust-gas heat management system according to FIGS. 2 to 5. Firstly, the operating state of the internal combustion engine 1 is determined, i.e. it is checked whether the internal combustion engine 1 is in a switched-on operating state.

If the internal combustion engine 1 is in a switched-on operating state, it is checked whether the PCM temperature is above the phase transition temperature of the PCM 7. In the exemplary embodiment, a salt mixture of sodium nitrate, potassium nitrate or calcium nitrate is used as the PCM 7, and the phase transition from the solid to the liquid state is considered as the phase transition. Thus, if the PCM temperature is above the phase transition temperature, the PCM 7 is in a liquid state. If the PCM temperature is below the phase transition temperature, the PCM 7 is in a solid state.

If the PCM temperature is below the phase transition temperature, the PCM circuit is deactivated, in that the pump device 9 is switched off. When the PCM is in a solid state, there is no benefit in starting the pump, and so the pump is maintained deactivated. If the PCM temperature is above the phase transition temperature, it is checked whether the PCM temperature is below a limit or threshold temperature. The limit temperature was defined previously as an ideal storage temperature, which may be 50 K lower than the maximum operating temperature of the catalytic converter 3.

If the PCM temperature is above the ideal storage temperature, the PCM circuit is deactivated, in that the pump device 9 is switched off. When the PCM salt is above the ideal storage temperature, there is not much potential for further temperature increase. Therefore at this time, the pump can be switch off to save energy. If the PCM temperature is below the ideal storage temperature, the PCM circuit is activated, in that the pump device 9 is switched on.

If the internal combustion engine 1 is in a switched-off operating state, it is checked whether the catalytic converter temperature is above the light-off temperature of the catalytic converter 3. If the catalytic converter temperature is above the light-off temperature of the catalytic converter 3, the PCM circuit is deactivated, in that the pump device 9 is switched off. If the catalytic converter temperature is below the light-off temperature, it is checked whether starting of the internal combustion engine 1 is anticipated.

If starting of the internal combustion engine 1 is not anticipated, the PCM circuit is deactivated, in that the pump device 9 is switched off. If starting of the internal combustion engine 1 is anticipated, the method as described above is continued with the checking of whether the PCM temperature is above the phase transition temperature of the PCM 7.

Insofar as activation or deactivation of the PCM circuit is mentioned in the above explanation, this is to be understood to include also leaving the PCM circuit in an activated or deactivated state, in that the pump device 9 remains switched on or switched off, respectively.

If, according to the flow diagram of FIG. 6, the field "pump device on" or "pump device off" is reached, the method can restart from the beginning with the checking of the operating state of the internal combustion engine. To that extent, the method for controlling the exhaust-gas heat management system may be realized as a closed-loop control method.

Figure 7:
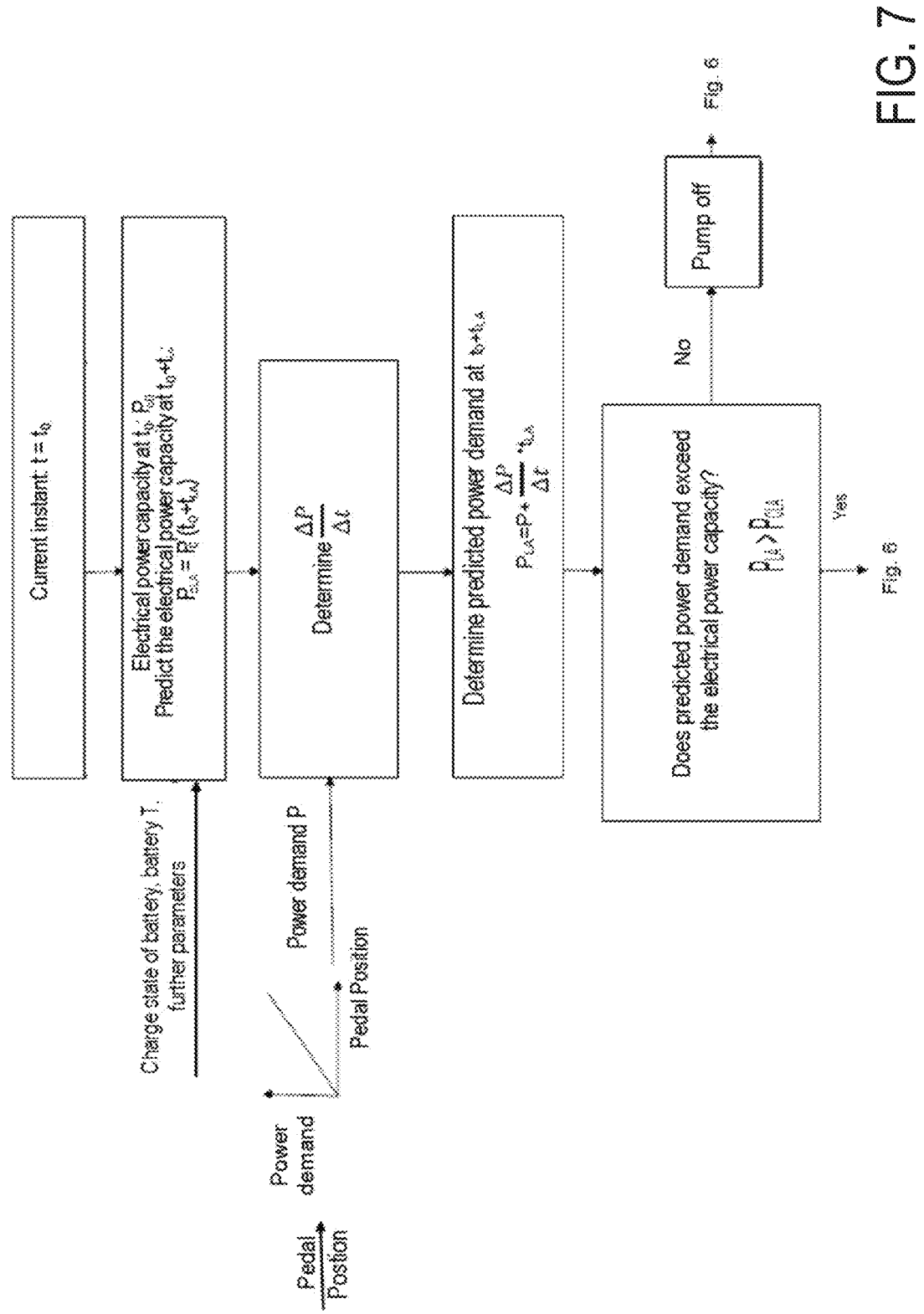
FIG. 7 shows a flow diagram for method steps for assessing whether starting of the internal combustion engine is to be anticipated.

Whether starting of the internal combustion engine 1 is to be anticipated, may be determined, for example, by means of the method steps that are represented schematically in FIG. 7.

The starting point is the current instant t0. At this instant t0, the electrical power capacity Pc0 is determined. The electrical power capacity at an instant in the future, which can be described as t0+tLA, is then predicted in dependence on parameters such as the charge state of the battery and the battery temperature.

In this case, tLA is to be understood to mean a time span going into the future. tLA may be specified as a constant, or defined in dependence on variables such as the catalytic converter temperature, the ambient temperature, etc.

The predicted electrical power capacity PCLA may be calculated as a function of the energy stored in the battery. In this case, the energy stored in the battery can be calculated in that the energy at the instant $t_a$ and the energy that is consumed or generated between $t_a$ and $t_e$ are added. The electrical energy that is consumed or generated between $t_a$ and $t_e$ in this case can be calculated as an integral of P(t) over the time from $t_a$ to $t_e$.

In addition, the power demand P is determined from the pedal position of the accelerator pedal, the power demand P being proportional to the pedal position. By means of the power demand P, the power demand per unit of time may be determined, as $\Delta P/\Delta t$. The power demand at t0+tLA is thus obtained as $PLA=P+\Delta P/\Delta t \cdot tLA$.

By comparison of the predicted electrical power capacity PCLA with the power demand PLA, it can be estimated whether starting of the internal combustion engine 1 is to be anticipated. If PLA>PCLA, starting of the internal combustion engine 1 is to be anticipated, and the method can be continued, as described above in connection with FIG. 6, with the determining of whether the PCM temperature is above the phase transition temperature. If PLA<PCLA, starting of the internal combustion engine 1 is not to be anticipated, and the PCM circuit is deactivated, in that the pump device 9 is switched off. The method can then be continued as described in connection with FIG. 6.

Figure 8:
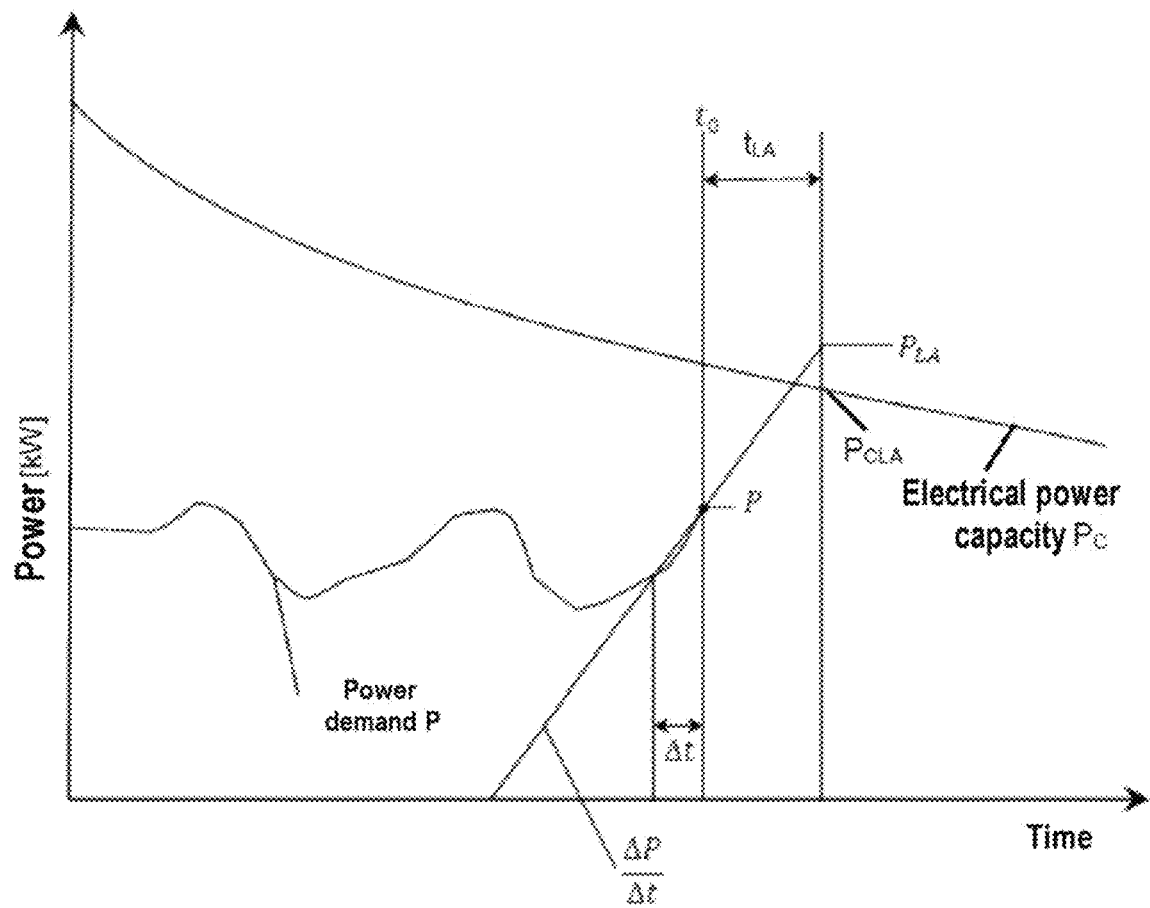
FIG. 8 is a representation of the electrical power as a function of time for method steps according to FIG. 7.

FIG. 8 shows the dependence of the electrical power on time, for the method steps according to FIG. 6. The figure shows the progression of the power demand P up to the current instant t0 and the time progression of the electrical power capacity PC. A time span tLA is defined, starting from the instant t0, following the expiry of which the power demand PLA is compared with the electrical power capacity PCLA. The power demand PLA is determined on the basis of the power demand P within a past time span $\Delta t$ ($\Delta P/\Delta t$). The selected time span $\Delta t$ should not be too short, in order to avoid unnecessary reactions resulting from slight variations of the pedal position. In the depicted example, the power demand PLA is determined to exceed the electrical power capacity PCLA after the time span tLA.

Figure 9:
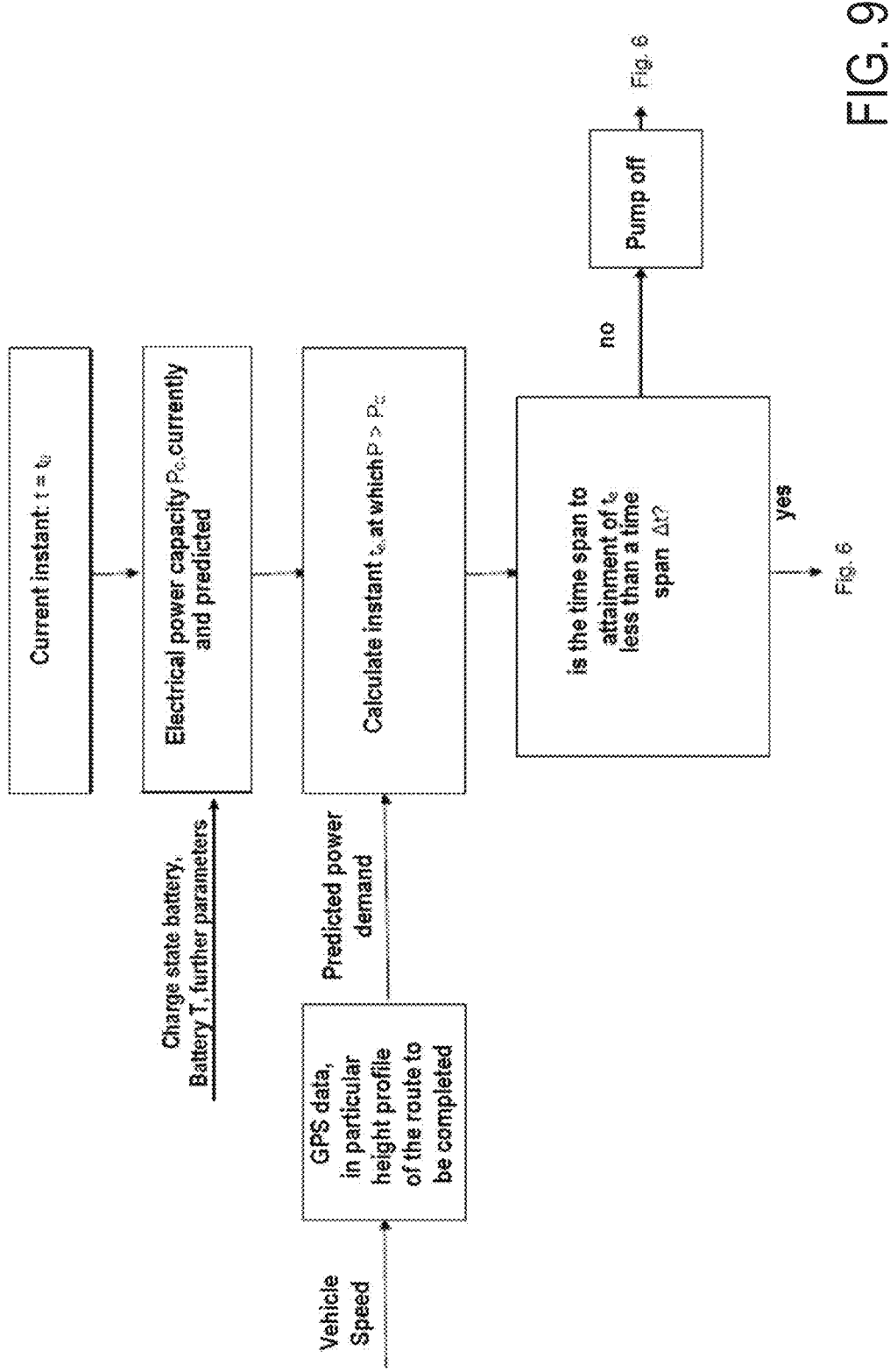
FIG. 9 shows a flow diagram for alternative method steps for assessing whether starting of the internal combustion engine is to be anticipated.

As an alternative to the method steps according to FIG. 7, whether starting of the internal combustion engine 1 is to be anticipated may be determined, for example, by means of the method steps represented schematically in FIG. 9.

The starting point is likewise the current instant t0. At this instant t0, the electrical power capacity Pc0 is determined. The current electrical power capacity Pc0 and the progression of the electrical power capacity PC for the future are determined in dependence on parameters such as the charge state of the battery and the battery temperature.

In addition, parameters such as the vehicle speed and the height profile of the route to be completed, determined by means of GPS, are used to determine the power demand P.

The instant te, at which the power demand P exceeds the electrical power capacity Pc, is then determined. If the time span up to the attainment of te is less than a time span $\Delta t$, starting of the internal combustion engine 1 is to be anticipated, and the method can be continued, as described above in connection with FIG. 6, with the determining of whether the PCM temperature is above the phase transition temperature. If the time span up to the attainment of te is greater than a time span $\Delta t$, starting of the internal combustion engine 1 is not to be anticipated, and the PCM circuit is deactivated, in that the pump device 9 is switched off. The method can then be continued as described in connection with FIG. 6. The time span $\Delta t$ may correspond, for example, to the light-off time span of the catalytic converter 3.

If a vehicle having an exhaust-gas heat management system has a satellite-assisted navigation system, e.g. a GPS system, and the driver inputs the destination, then the exhaust-gas heat management system can determine the route conditions of the route to be completed, and can determine the power demand for completion of this route, e.g. with a constant speed being assumed. These method steps render possible longer prediction periods than the method steps described previously in connection with FIG. 7.

Figure 10:
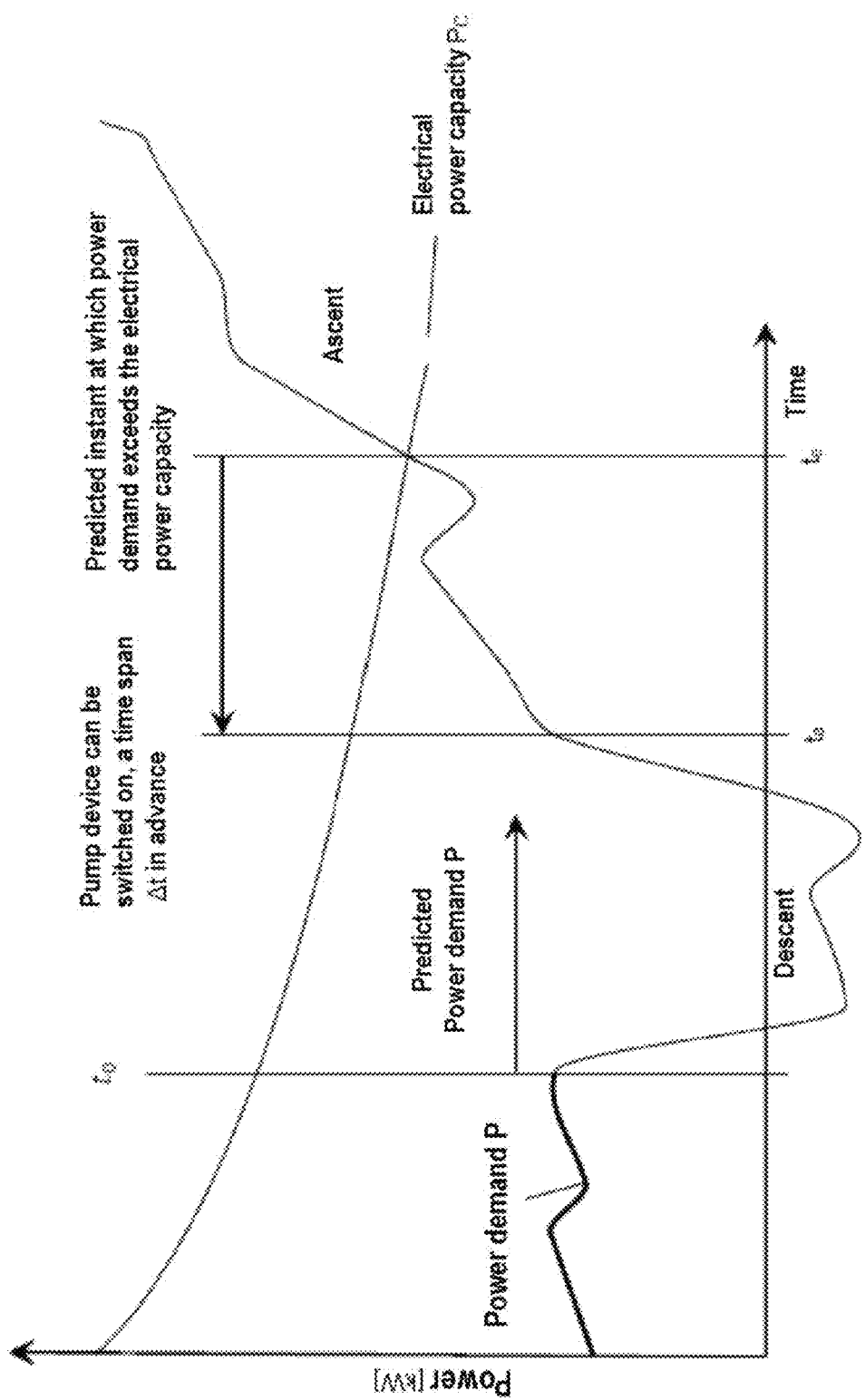
FIG. 10 is a representation of the electrical power as a function of time for method steps according to FIG. 9.

FIG. 10 shows the dependence of the electrical power on time, for the method steps according to FIG. 9. The figure shows the progression of the power demand P up to the current instant t0, the predicted power demand as a function of the height profile and of the speed profile—taking account of speed restrictions, bend radii, etc.—of the route to be completed, and the time progression of the electrical power capacity PC. Starting from the instant ta, the projected electrical power capacity and the projected power demand at the instant $t_e = t_a + \Delta t$ are calculated continuously. Should the calculations show that, at the instant $t_e$, the predicted power demand P exceeds the electrical power capacity $P_C$, the PCM circuit is activated immediately, i.e. the pump device 9 is switched on—provided that other preconditions are also fulfilled, such as those described with reference to FIG. 6. The time span $\Delta t$ may correspond, for example, to the light-off time span of the catalytic converter 3.

Figure 11:
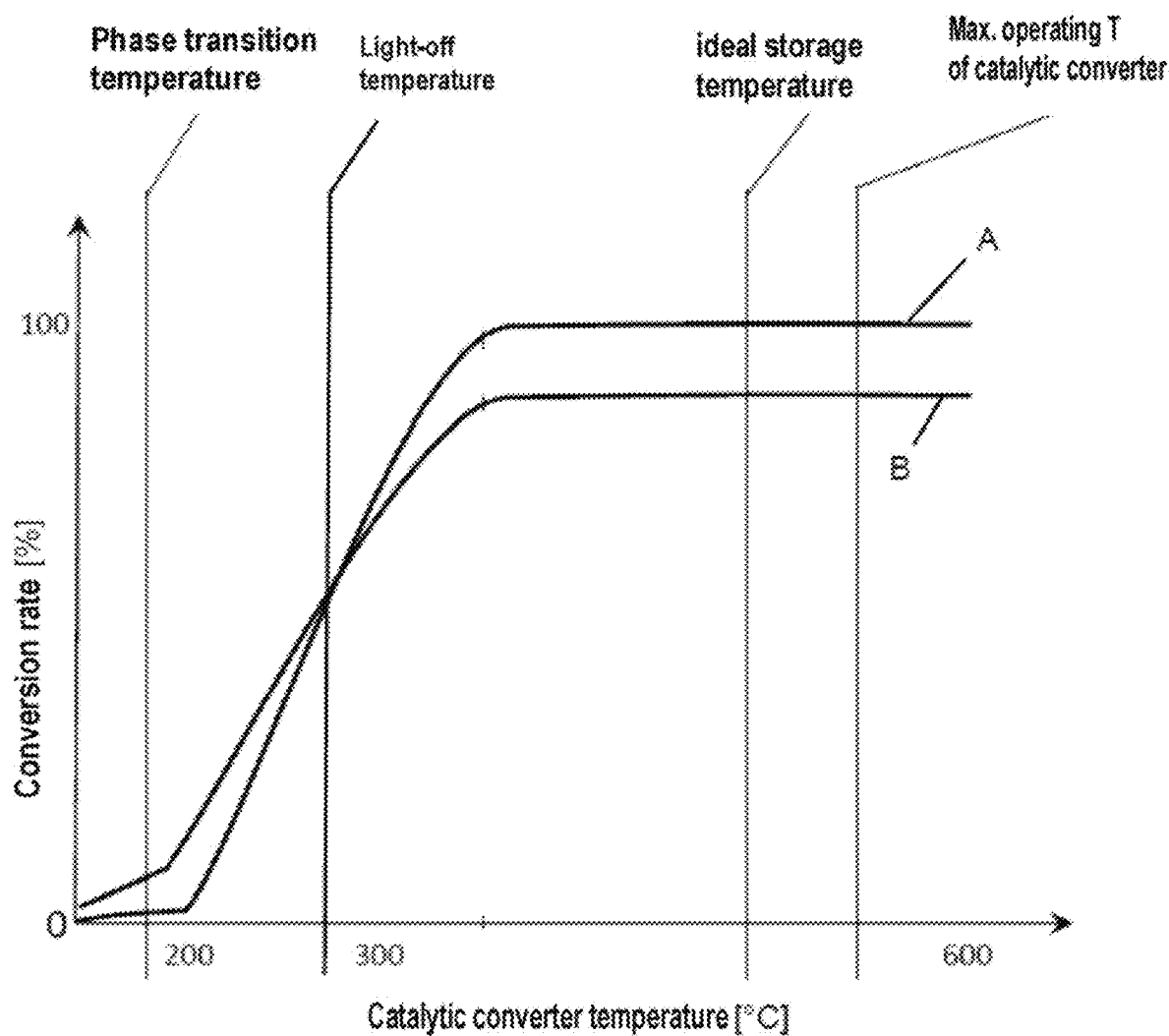
FIG. 11 is an overview of characteristic temperatures.

FIG. 11 shows an overview of characteristic temperatures in comparison with the temperature dependence of the conversion rate for nitrogen oxides and hydrocarbons (curve A) and carbon monoxide (curve B). The maximum operating temperature of the catalytic converter 3 corresponds to the maximum exhaust-gas temperature, and is approximately 600° C. The ideal storage temperature, as a limit temperature for the PCM 7, should be approximately 50 K lower, i.e. approximately 550° C. The phase transition temperature of the PCM 7 is below 200° C., i.e. in a temperature range in which the conversion rate of the catalytic conversion is very low.

Figure 12:
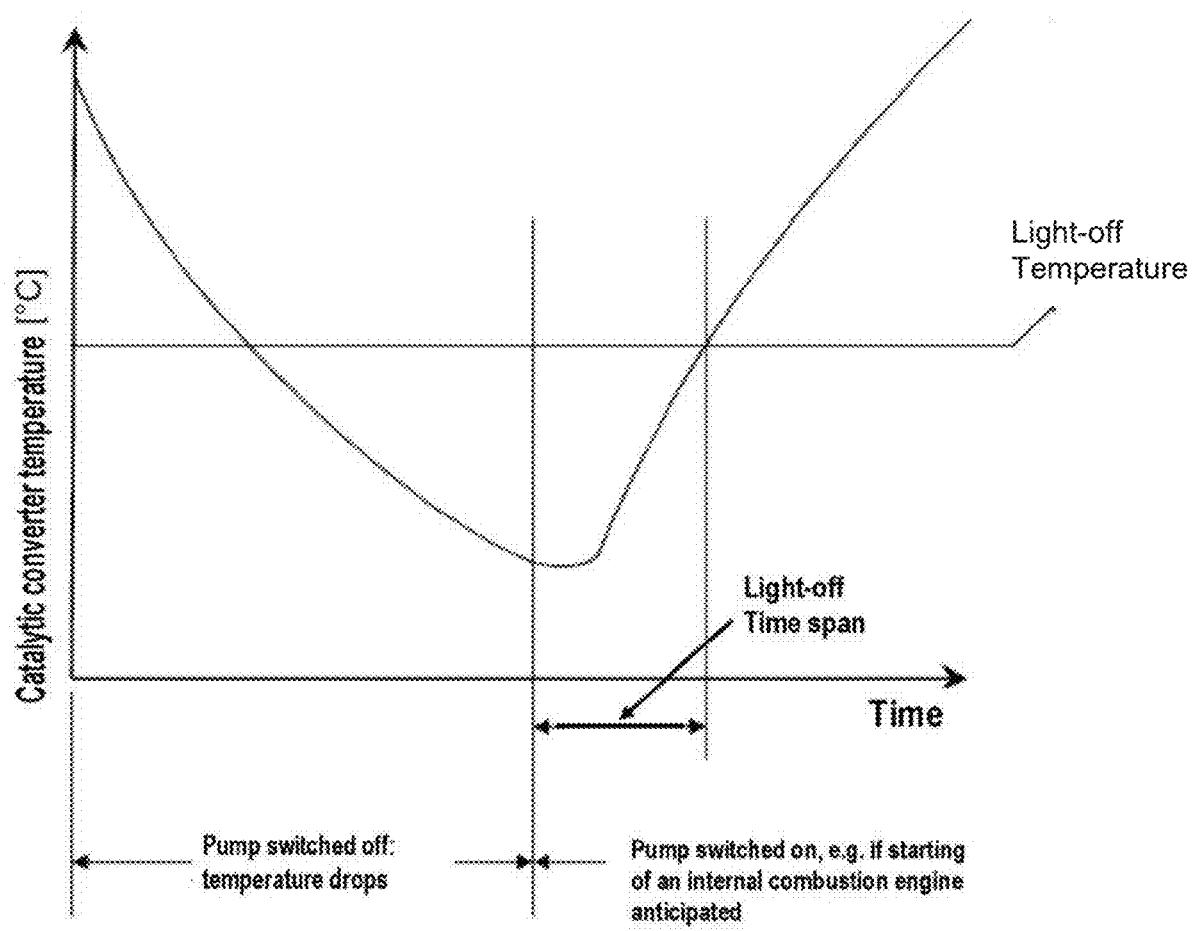
FIG. 12 shows the schematic progression of the catalytic converter during the electric driving mode.

FIG. 12 shows the schematic progression of the catalytic converter temperature during the electric driving mode. If the PCM circuit is deactivated, i.e. the pump device 9 is switched off, the temperature of the catalytic converter 3 drops to a temperature below the light-off temperature. If the PCM circuit is activated by means of switching-on of the pump device 9, e.g. if the starting of the internal combustion engine is anticipated, the temperature of the catalytic converter 3 rises again, since thermal energy is transferred from the PCM 7 to the catalytic converter 3. A delay in the temperature rise results from the volume of the comparatively cold PCM present in the fluid connections. It is only when the PCM 7 reaches the catalytic converter from the collecting vessel 6 that the temperature of the catalytic converter 3 rises. The time span that is required to attain the light-off temperature of the catalytic converter 3, while accounting for the delay in the temperature rise, is the light-off time span.

It is to be noted that the light-off time span is usually not constant, and may depend, for example, on parameters such as the PCM temperature, the catalytic converter temperature, the ambient temperature and the speed of the vehicle.

Figure 13:
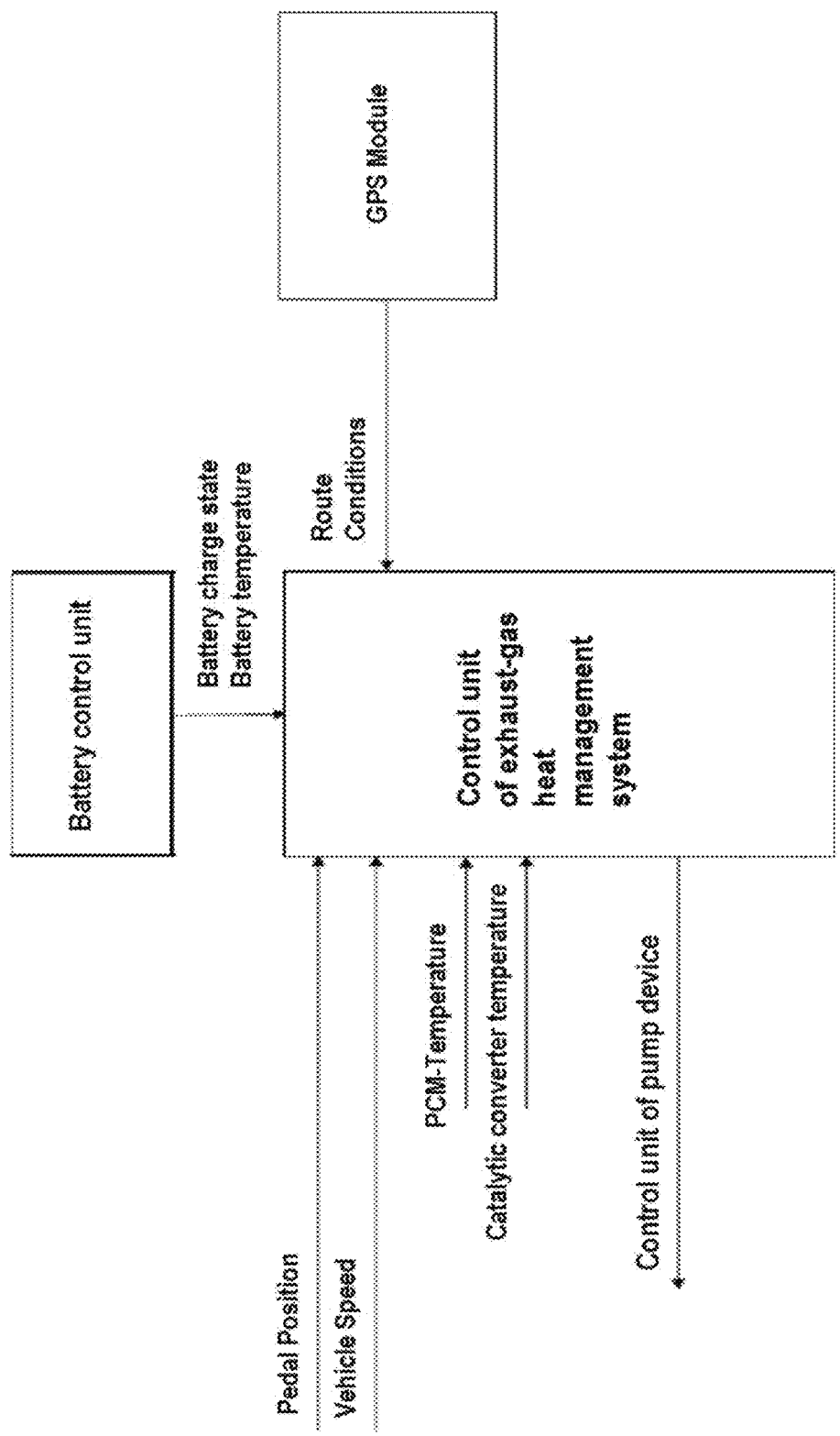
FIG. 13 is a schematic representation of the signal inputs and signal outputs of the control unit of an exhaust-gas heat management system.

FIG. 13 shows a schematic representation of the possible signal inputs and signal outputs of the control unit 19 of an exhaust-gas heat management system, wherein the control unit 19 may be realized as part of the engine control unit, or integrated into the engine control unit.

The control unit 19 receives signals of the GPS module with regard to the route conditions of the route to be completed, e.g. height profile, route surface, bends, etc. Further signals, e.g. concerning the battery temperature and the charge state of the battery, are received from the battery control unit. In addition, the control unit 19 receives signals with regard to the pedal position, the vehicle speed, the PCM temperature and the catalytic converter temperature. After processing the obtained signals, the control unit 19 transmits the signals to the control unit of the pump device 9 for the purpose of activating or deactivating the PCM circuit.

One example hybrid vehicle method comprises: during an engine-on state, circulating a phase change material (PCM) through a cavity surrounding an exhaust catalytic-converter to store exhaust heat at the PCM; and during an engine-off state, responsive to catalytic-converter temperature being lower than a threshold when a transition to the engine-on state is anticipated, circulating the PCM through the cavity, to transfer stored exhaust heat from the PCM to the catalytic-converter. In the preceding example, additionally or optionally, the engine-on state includes the vehicle being driven using torque from an engine, wherein the engine-off state includes the vehicle being driven via torque from an electric motor, and wherein during both the engine-on and the engine-off state, the circulating includes operating a pump to circulate the PCM from a heat storage tank to the cavity via a fluid connection, and wherein during both the engine-on and engine-off state, the phase change material is above a phase change temperature. In any or all of the preceding examples, additionally or optionally, the PCM includes a salt and wherein during both the engine-on and the engine-off state, the pump is operated while the PCM is in a liquid state, and the pump is deactivated responsive to the PCM being in a solid state or the PCM being above a storage temperature, higher than the phase change temperature. In any or all of the preceding examples, additionally or optionally, the method further comprises, during the engine-off state, delaying the circulating responsive to the PCM being in the solid state. In any or all of the preceding examples, additionally or optionally, the circulating during the engine-off state is for a duration based on each of catalyst temperature, vehicle speed, ambient air temperature, and PCM temperature. In any or all of the preceding examples, additionally or optionally, during the engine-on state, circulating the PCM to store exhaust heat includes transferring the heated PCM to a storage tank in fluidic communication with an engine cooling circuit, and transferring heat from the heated PCM to an engine coolant circulating through the engine cooling circuit.

In a further representation, a method for a hybrid vehicle comprises: during engine mode of operation of the hybrid vehicle, circulating a phase change material (PCM), via operation of a pump, through a cavity surrounding an exhaust catalytic-converter to store exhaust heat at the phase change material; and during electric mode of operation of the hybrid vehicle, responsive to catalytic-converter temperature being lower than a threshold when a transition to the engine mode is anticipated, circulating the phase change material through the cavity, via operation of the pump, to transfer the stored exhaust heat from the phase change material to the catalytic-converter.

The invention claimed is:

1. A method for controlling an exhaust-gas heat management system, having a catalytic converter arranged in an exhaust-gas train of an internal combustion engine, a cover enclosing the catalytic converter for realizing a cavity between the catalytic converter and the cover, a collecting vessel for holding a latent-heat storage medium, referred to in the following as PCM, at least two fluid connections between the cavity and the collecting vessel and a pump device for activating and deactivating a PCM circuit between the cavity and the collecting vessel by means of the fluid connections, comprising:

determining an operating state of the internal combustion engine;
determining a catalytic converter temperature;
determining a PCM temperature;
activating the PCM circuit if the PCM temperature is above a phase transition temperature of the PCM; and the internal combustion engine is in a switched-on or a switched-off operating state, and the switched-off operating state occurs with the catalytic converter temperature below a light-off temperature of the catalytic converter; and
deactivating the PCM circuit if either the internal combustion engine is in the switched-off operating state and the catalytic converter temperature is above the light-off temperature of the catalytic converter, or the PCM temperature is below the phase transition temperature of the PCM.

2. The method as claimed in claim 1, further comprising: defining a limit temperature for the PCM, wherein the PCM circuit is activated only if the PCM temperature is below the limit temperature.

3. The method as claimed in claim 2, wherein the limit temperature is defined so as to be equal to a maximum operating temperature or between 20 and 80 K lower than the maximum operating temperature of the catalytic converter.

4. The method of claim 1, wherein when the catalytic converter is in the switched-off operating state, the PCM circuit is activated only if a change in the operating state of the internal combustion engine to the switched-on operating state is anticipated.

5. The method as claimed in claim 4, further comprising:
determining a power demand P;
determining an electrical power capacity $P_C$; and
anticipating a change in the operating state of the internal combustion engine to the switched-on operating state, if the power demand P exceeds the electrical power capacity $P_C$.

6. The method as claimed in claim 5, further comprising: defining a time span $\Delta t$,
wherein the change in the operating state of the internal combustion engine to the switched-on operating state is anticipated if the power demand P exceeds the electrical power capacity $P_C$ within the time span $\Delta t$.

7. The method as claimed in claim 6, further comprising, starting from a current instant $t_a$, continuously projecting and comparing the power demand P and the electrical power capacity $P_C$ at an instant $t_e = t_a + \Delta t$ with each other, and; if the electrical power capacity $P_C$ is exceeded by the power demand P, activating the PCM circuit at the current instant $t_a$.

8. The method as claimed in claim 6, wherein the time span Δt is defined in accordance with a light-off time span of the catalytic converter.

9. The method as claimed in claim 5, wherein the power demand P is determined from a pedal position of an accelerator pedal.

10. The method as claimed in claim 5, wherein the power demand P is determined based on route conditions of a route to be completed.

11. An exhaust-gas heat management system, comprising:
a catalytic converter arranged in an exhaust-gas train of an internal combustion engine;
a cover enclosing the catalytic converter for realizing a cavity between the catalytic converter and the cover;
a collecting vessel for holding a latent-heat storage medium (PCM);
at least two fluid connections between the cavity and the collecting vessel;
a pump device for activating and deactivating a PCM circuit between the cavity and the collecting vessel via the at least two fluid connections;
a sensor for determining an operating state of the internal combustion engine;
a temperature sensor for estimating one or more of a catalytic converter temperature and a PCM temperature; and
a control unit with computer readable instructions stored on non-transitory memory that when executed cause the control unit to:
control the pump device in dependence on each of: the operating state of the internal combustion engine, the catalytic converter temperature, and the PCM temperature.

12. The exhaust-gas heat management system as claimed in claim 11, wherein the control unit includes further instructions that when executed cause the control unit to:
in a case that the catalytic converter is in a switched-off operating state, activating the PCM circuit only if a change in the operating state of the internal combustion engine to a switched-on operating state is anticipated.

13. The exhaust-gas heat management system of claim 11, wherein the system is coupled in a motor vehicle.

14. The exhaust-gas heat management system as claimed in claim 13, wherein the motor vehicle is a plug-in hybrid electric vehicle.

15. A hybrid vehicle method, comprising:
during an engine-on state and in dependence on a catalytic-converter temperature and a phase change material (PCM) temperature, circulating the PCM through a cavity surrounding a catalytic-converter to store exhaust heat at the PCM; and
during an engine-off state, responsive to the catalytic-converter temperature being lower than a threshold when a transition to the engine-on state is anticipated and the PCM temperature, circulating the PCM through the cavity to transfer stored exhaust heat from the PCM to the catalytic-converter.

16. The method of claim 15, wherein the engine-on state includes a vehicle being driven using torque from an engine, wherein the engine-off state includes the vehicle being driven via torque from an electric motor, and wherein during both the engine-on and the engine-off states, the circulating includes operating a pump to circulate the PCM from a heat storage tank to the cavity via a fluid connection, and wherein during both the engine-on and engine-off states, the PCM is above a phase change temperature.

17. The method of claim 16, wherein the PCM includes a salt and wherein during both the engine-on and the engine-off states, the pump is operated while the PCM is in a liquid state, and the pump is deactivated responsive to the PCM being in a solid state or the PCM being above a storage temperature, higher than the phase change temperature.

18. The method of claim 17, further comprising, during the engine-off state, delaying the circulating responsive to the PCM being in the solid state.

19. The method of claim 15, wherein the circulating during the engine-off state is for a duration based on each of catalyst temperature, vehicle speed, ambient air temperature, and PCM temperature.

20. The method of claim 17, wherein during the engine-on state, circulating the PCM to store exhaust heat includes transferring the heated PCM to a storage tank in fluidic communication with an engine cooling circuit, and transferring heat from the heated PCM to an engine coolant circulating through the engine cooling circuit.

* * * * *